United States Patent
Marshall et al.

(10) Patent No.: US 7,679,556 B2
(45) Date of Patent: Mar. 16, 2010

(54) METHOD OF DETERMINING A GPS POSITION FIX AND A GPS RECEIVER FOR THE SAME

(75) Inventors: Christopher Brian Marshall, Haywards Heath (GB); Paul Arthur Gough, Smallfield (GB); Bryan D Young, Haywards Heath (GB); Saul R Dooley, Reigate (GB)

(73) Assignee: Geotate B.V., Eindhoven (NL)

( * ) Notice: Subject to any disclaimer, the term of this patent is extended or adjusted under 35 U.S.C. 154(b) by 0 days.

(21) Appl. No.: 12/067,488

(22) PCT Filed: Sep. 20, 2006

(86) PCT No.: PCT/IB2006/053387

§ 371 (c)(1),
(2), (4) Date: Mar. 20, 2008

(87) PCT Pub. No.: WO2007/034419

PCT Pub. Date: Mar. 29, 2007

(65) Prior Publication Data

US 2008/0231510 A1  Sep. 25, 2008

(30) Foreign Application Priority Data

Sep. 21, 2006 (EP) .................................. 05108699

(51) Int. Cl.
*G01S 1/02* (2006.01)
*G01S 5/14* (2006.01)

(52) U.S. Cl. ............................ 342/357.06; 342/357.12; 342/357.13; 701/213

(58) Field of Classification Search ............ 342/357.01, 342/357.06, 357.12, 357.13; 701/213, 215
See application file for complete search history.

(56) References Cited

U.S. PATENT DOCUMENTS

| 5,726,660 A | 3/1998 | Purdy et al. |
| 6,016,119 A | 1/2000 | Krasner |
| 2002/0050944 A1 | 5/2002 | Sheynblat et al. |

FOREIGN PATENT DOCUMENTS

| WO | 2004090903 A1 | 10/2004 |
| WO | 2005125183 A2 | 12/2005 |

*Primary Examiner*—Dao L Phan
(74) *Attorney, Agent, or Firm*—Blakely, Sokoloff, Taylor & Zafman LLP

(57) ABSTRACT

A method of determining a GPS position fix. The method includes: (i) sampling received GPS signals and storing those samples; (ii) conducting preliminary processing of those GPS signal samples to determine the likelihood of being able to obtain a position fix during later, final processing of those GPS signal samples; and (iii) after step (ii), conducting final processing of those GPS signal samples to obtain a position fix.

7 Claims, 1 Drawing Sheet

METHOD OF DETERMINING A GPS POSITION FIX AND A GPS RECEIVER FOR THE SAME

Figure 1:
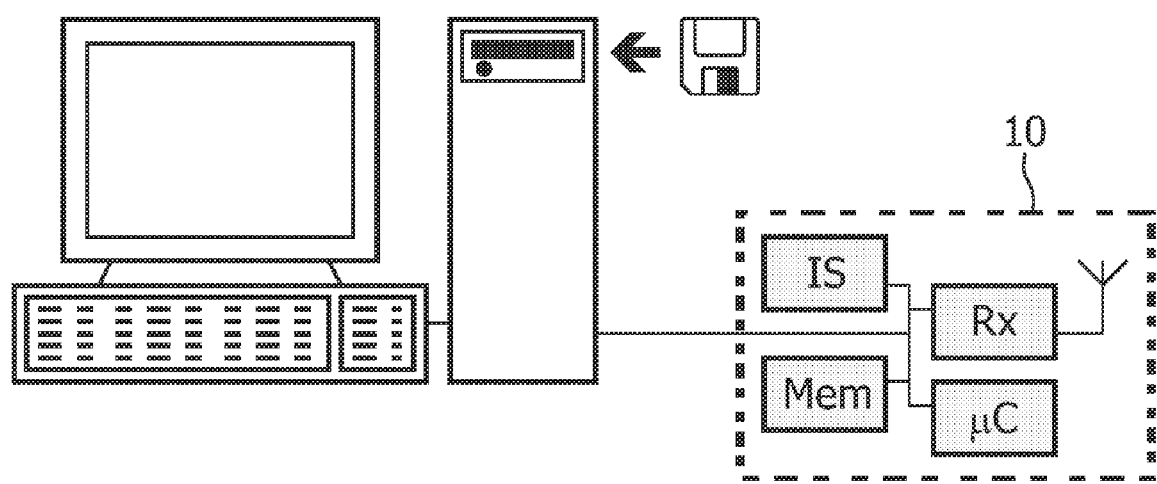

BACKGROUND OF THE INVENTION (1) Field of the Invention

This invention relates to a method of determining a GPS position fix and a GPS receiver for the same.

(2) Description of the Related Art

Philips published PCT patent application WO2004/090903A1 discloses a method of appending a position stamp to an image file of a photo or video clip taken with a digital camera having a GPS antenna and a GPS RF front-end including an analogue to digital converter for receiving GPS signals and outputting GPS signal samples together with a digital camera and computer for the same. The method comprising the steps of: (i) upon a user taking a photo or video clip: (a) creating an image file containing that photo or video clip, and (b) sampling received GPS signals and storing those GPS signal samples with an indication of the image file of the photo or video clip to which those GPS signal samples pertain; and (ii) subsequently processing the GPS signal samples to obtain a position fix and appending the position fix to the image file.

Such storing of GPS signal samples and later processing beneficially enables, for example, processing of the GPS signal samples on an external computer or, for the purposes of extending the battery life of the camera, processing in the camera only when the camera connected to an external power source or specifically requested to do so.

BRIEF SUMMARY OF THE INVENTION

In accordance with the present invention, there is provided a method of determining a GPS position fix comprising the steps of: (i) sampling received GPS signals and storing those samples; (ii) conducting preliminary processing of those GPS signal samples to determine the likelihood of being able to obtain a position fix during later, final processing of those GPS signal samples; and (iii) after step (ii), conducting final processing of those GPS signal samples to obtain a position fix.

The inventors have realised there is a problem with the approach of sampling and then sometime later processing those signal samples to obtain a position fix in that it may in fact be impossible to obtain a position fix a particular batch of GPS signal samples. For example, at the moment of sampling, there may be transient RF interference or a temporary blockage of the line of sight to the number of satellites required to obtain a position fix, e.g. obscuration by a high sided vehicle in an urban canyon. Furthermore, if a GPS receiver then moves location after the initial sampling but prior to processing to obtain a position fix, by the time that this problem is discovered, there is no way to recover the position of the receiver at the time the initial sampling was done.

By conducting preliminary processing of such GPS signal samples to determine the likelihood of being able to obtain a position fix during later, this problem may is avoided whereby, for example, upon a negative determination in step (ii), steps (i) and (ii) can be repeated. This likelihood can be expressed as a binary parameter or graduated. It can also be conveyed to the user.

Also provided in accordance with the present invention is a GPS receiver comprising a GPS RF front-end including an analogue to digital converter for receiving GPS signals and outputting GPS signal samples and a processor; the GPS RF front end and processor collectively configured to perform a method as described above.

BRIEF DESCRIPITION OF THE DRAWING

The present invention will now be described, by way of example only, with reference to the accompanying figure which shows, schematically, a PC connected to a digital camera including GPS receiver device, operating in accordance with the present invention.

DETAILED DESCRIPTION OF THE INVENTION

Referring to the accompanying figure, the PC is connected via a USB PC port and corresponding cable to a digital camera 10 which comprises a GPS front-end receiver (Rx) connected to a GPS antenna, an image sensor (IS) and memory (Mem), all under the control of a micro-controller µC.

When operative, the GPS receiver receives NAVSTAR SPS GPS signals through its antenna and pre-process them, typically by passive bandpass filtering in order to minimise out-of-band RF interference, preamplification, down conversion to an intermediate frequency (IF) and analogue to digital conversion. The IF signal remains modulated, still containing all the information from the available satellites. The resultant GPS signal samples are then stored in the memory (Mem).

The digital camera and PC may generate a position stamped image file as illustrated in any of the following example scenarios:

EXAMPLE 1

Upon a user in possession of the camera taking a photo, an image file containing that photo is created and stored in the memory.

At the same time, the GPS receiver receives and samples GPS signals and stores the resultant GPS signal samples in a data file format in the memory together with an indication of the image file to which the GPS signal samples pertain. This is done with the intention that once the user returns home and connects the digital camera to the user's home PC, the image file and corresponding GPS signal samples will be uploaded to the PC. The GPS signal samples will then be processed using appropriate PC based GPS signal processing software and the PCs more powerful processor to recover pseudorange information from which the position of the digital camera when the corresponding photo was taken can be determined using conventional navigation algorithms. Such GPS signal acquisition and pseudorange processing is well known, for example, see GPS Principles and Applications (Editor, Kaplan) ISBN 0-89006-793-7 Artech House. The position fix is then appended the image file.

In accordance with the present invention, immediately after the GPS receiver receives and samples GPS signals and stores the resultant GPS signal samples (i.e. prior to uploading to a PC), camera based GPS signal processing software conducts preliminary GPS signal processing to determine the likelihood of being able to obtain a position fix during the final PC based processing. Such preliminary signal processing consists of despreading a single GPS signal and measuring the signal strength of which a good signal strength is indicative of the camera being outdoors with no obscuration, and hence indicative of the high likelihood of being able to obtain such a position fix during later, final PC based processing.

If the signal strength is poor, the GPS receiver immediately re-samples received GPS signals for an extended period, replacing the initial batch of GPS signal samples and thereby increasing the likelihood that a position fix can be obtained during later PC based signal processing.

EXAMPLE 2

As example 1 except that the preliminary processing consists of despreading two GPS signals and determining when a pseudorange can be measured therefrom. If pseudoranges can not be measured, the GPS receiver immediately re-samples received GPS signals for an extended period.

EXAMPLE 3

As example 1 except that the preliminary processing consists of despreading and at least three GPS signal processing to obtain a test position fix using either out of date or dummy ephemeris data. If a test position fix can not be obtained, the GPS receiver immediately re-samples received GPS signals for an extended period. Note, three pseudoranges would be enough to obtain a position fix when making the assumption that the receiver was at zero altitude. Four would be necessary if one could not make such an assumption.

In the above examples, if the time of sampling is recorded and uploaded to a computer together with the GPS signal samples, appropriate ephemeris data can be provided by the PC (either downloaded from a remote server or received from a local GPS receiver) in order for that computer to execute step (iii) in order to obtain a position fix.

As further alternative to the above three examples in which the GPS signal processing software is PC based, it may be wholly camera based whereby GPS signal samples are fully processed in the camera but only after an intentional delay after preliminary processing. For example, the GPS signal samples might only be fully processed after detecting the connection of the camera to an external power source, some time after the preliminary processing has been done. In such a case and upon a positive determination in step (ii), further sampling of received GPS signals and storing of those samples may be done in order to obtain sufficient ephemeris data in order to execute step (iii). A small chunk of 30 consecutive bit periods ought to suffice.

As a yet further alternative to the above three examples, pseudoranges determined during the preliminary processing are reused together with up to date ephemeris data to determine the position fix.

Whilst the invention has been described in the context of NAVSTAR GPS, the all weather, spaced based navigation system developed and currently operated by the US Department of Defense, it will be appreciated that the invention is equally applicable to other global positioning systems including GLONASS and Galileo and hybrids thereof.

Furthermore, whilst the invention has been described in the context of a camera with a GPS receiver, the invention is not limited to this GPS application. Rather, it is equally applicable to any GPS receiver which stores GPS signal samples and later processing.

The invention claimed is:

1. A method of determining a GPS position fix comprising the steps of:
   (i) sampling received GPS signals and storing those samples;
   (ii) conducting preliminary processing of those GPS signal samples to determine the likelihood of being able to obtain a position fix during later, final processing of those GPS signal samples; and
   (iii) after an intentional delay after step (ii), conducting final processing of those GPS signal samples or derivatives thereof obtained during step (ii) to obtain a position fix,
   wherein, upon a negative determination in step (ii), steps (i) and (ii) are repeated.

2. A method according to claim 1 wherein the preliminary processing comprises despreading and measuring the signal strength of at least one GPS signal.

3. A method according to claim 1 wherein the preliminary processing comprises despreading at least one GPS signal and determining when a pseudorange can be measured therefrom.

4. A method according to claim 1 wherein the preliminary processing comprises despreading at least three GPS signal processing to obtain a test position fix using either out of date or dummy ephemeris data.

5. A method according to claim 1 wherein the preliminary processing comprises processing the GPS signals to obtain a position fix using either out of date or dummy ephemeris data.

6. A method according to claim 5 wherein pseudoranges determined during the preliminary processing are reused together with up to date ephemeris data to determine the position fix in step (iii).

7. A GPS receiver comprising a GPS RF front-end including an analogue to digital converter for receiving GPS signals and outputting GPS signal samples and a processor; the GPS RF front end and processor collectively configured to perform a method according to claim 1.

* * * * *